United States Patent
Takeuchi et al.

(10) Patent No.: US 6,999,006 B2
(45) Date of Patent: Feb. 14, 2006

(54) ROTATION POSITION DETECTING DEVICE

(75) Inventors: Hiroyuki Takeuchi, Handa (JP);
Takuya Harada, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/988,515

(22) Filed: Nov. 16, 2004

(65) Prior Publication Data
US 2005/0177338 A1    Aug. 11, 2005

(30) Foreign Application Priority Data
Feb. 9, 2004    (JP)    ............................. 2004-031944

(51) Int. Cl.
*H03M 1/22*    (2006.01)
(52) U.S. Cl. .......................................... 341/11; 341/6
(58) Field of Classification Search .................. 341/11, 341/6; 318/603, 369
See application file for complete search history.

(56) References Cited

U.S. PATENT DOCUMENTS

| | | | |
|---|---|---|---|
| 4,085,890 A * | 4/1978 | Kimura et al. ............... 235/419 |
| 4,604,575 A * | 8/1986 | Shimizu et al. ......... 324/207.18 |
| 5,264,844 A | 11/1993 | Itou et al. ..................... 341/11 |
| 5,493,188 A * | 2/1996 | Yoshikawa et al. ......... 318/254 |
| 6,323,876 B1 * | 11/2001 | Rao et al. .................... 345/634 |

* cited by examiner

*Primary Examiner*—Peguy JeanPierre
(74) *Attorney, Agent, or Firm*—Posz Law Group, PLC

(57) ABSTRACT

A rotation position detecting device includes an angular signal generator which generates pulses the cycle period of which is even or equal when a rotating object rotates at a constant rotation speed and a non-pulse portion which corresponds to a reference position, an up-down command circuit for generating an up-down command signal the frequency of which is divided to a half of the frequency of the angular signal, a pair of first counters for counting up or down the clock signal when the up-down command signal changes from a first level to a second level to reset and subsequently counting down the clock signal when the up-down command signal changes from the second level to the first level, a pair of processing circuits for providing a first and second reference values, a pair of counters which generates detection signals when the counted number of the counters becomes smaller than the first or the second reference value.

8 Claims, 12 Drawing Sheets

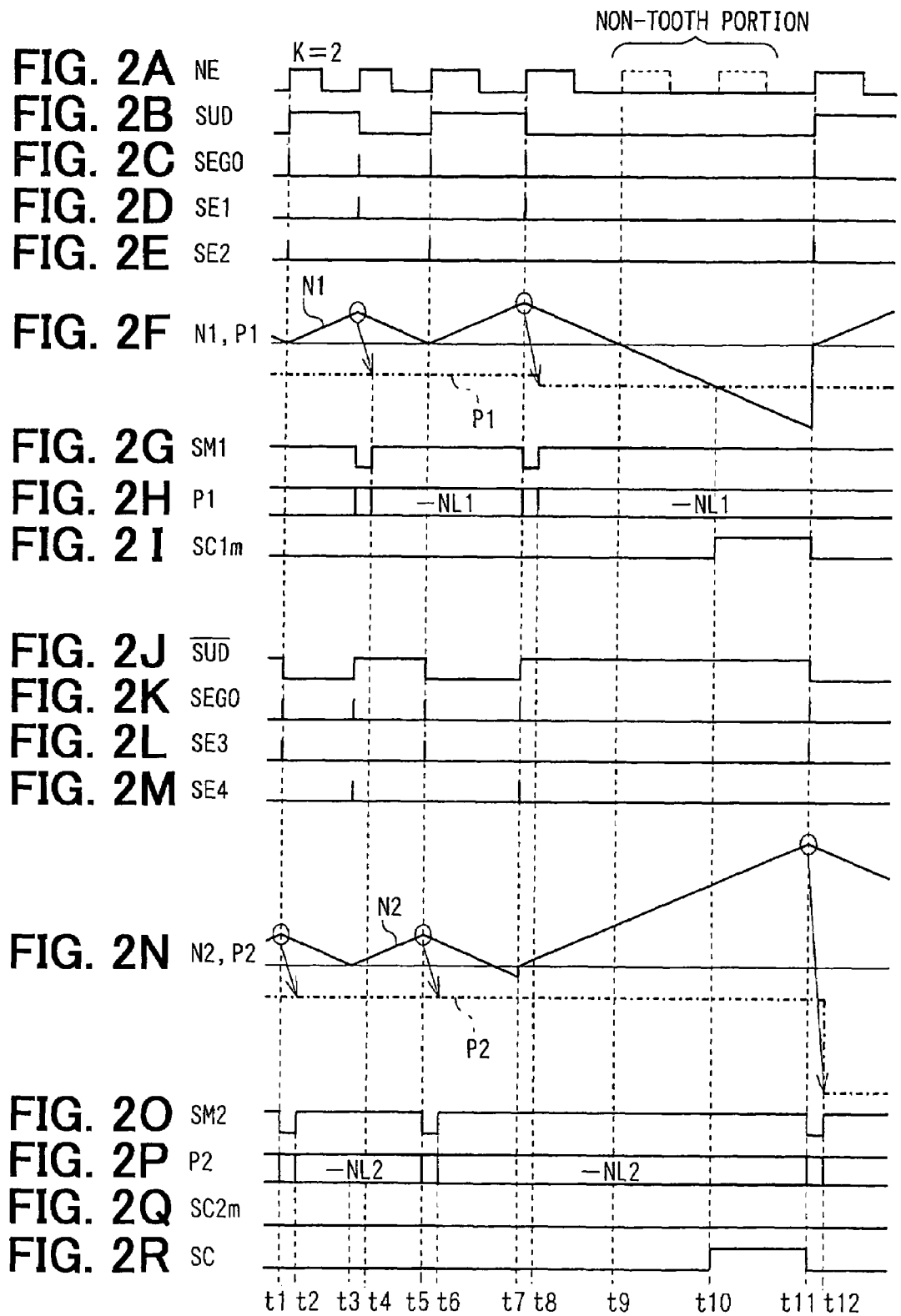

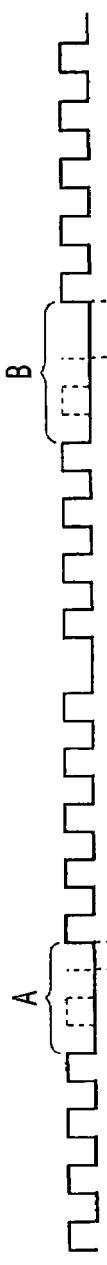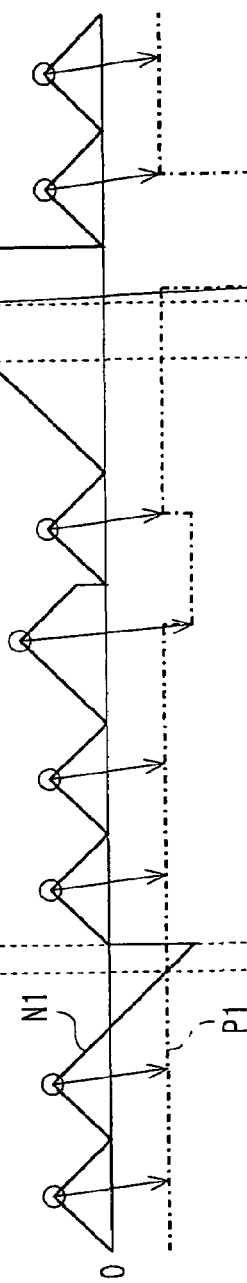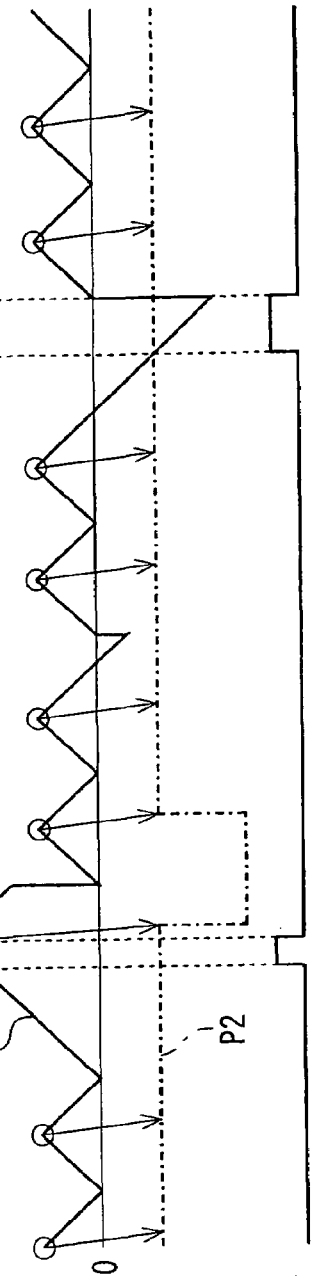

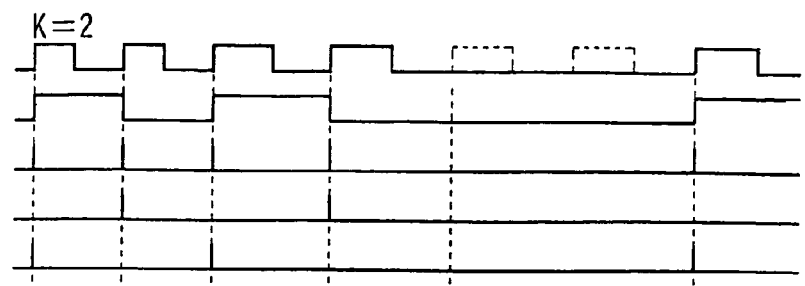

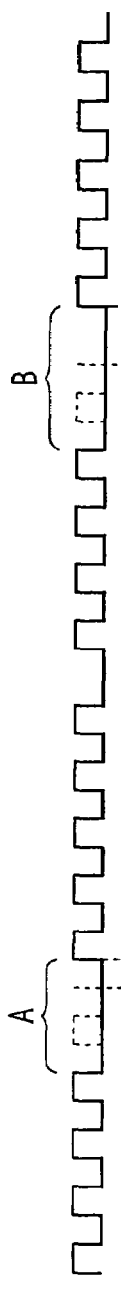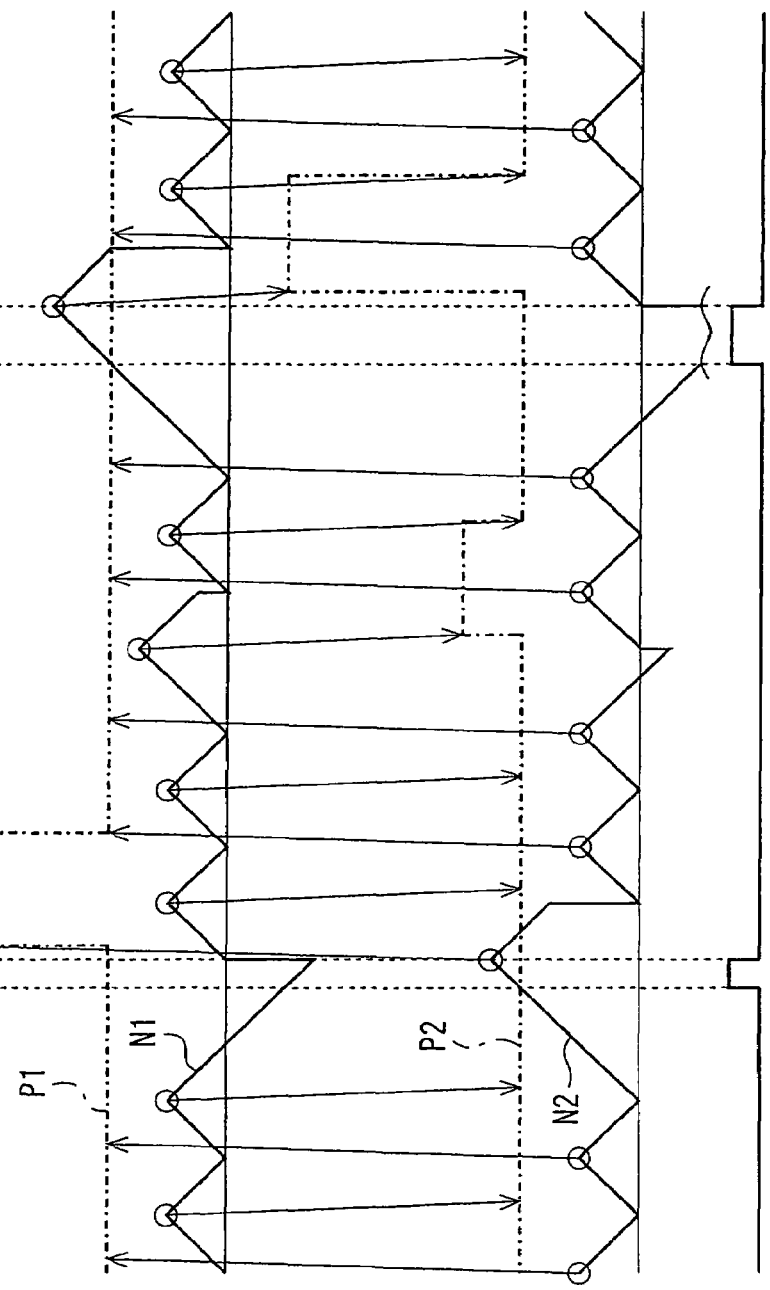
FIG. 6A NE
FIG. 6B N1, P1
FIG. 6C N2, P2
FIG. 6D SC

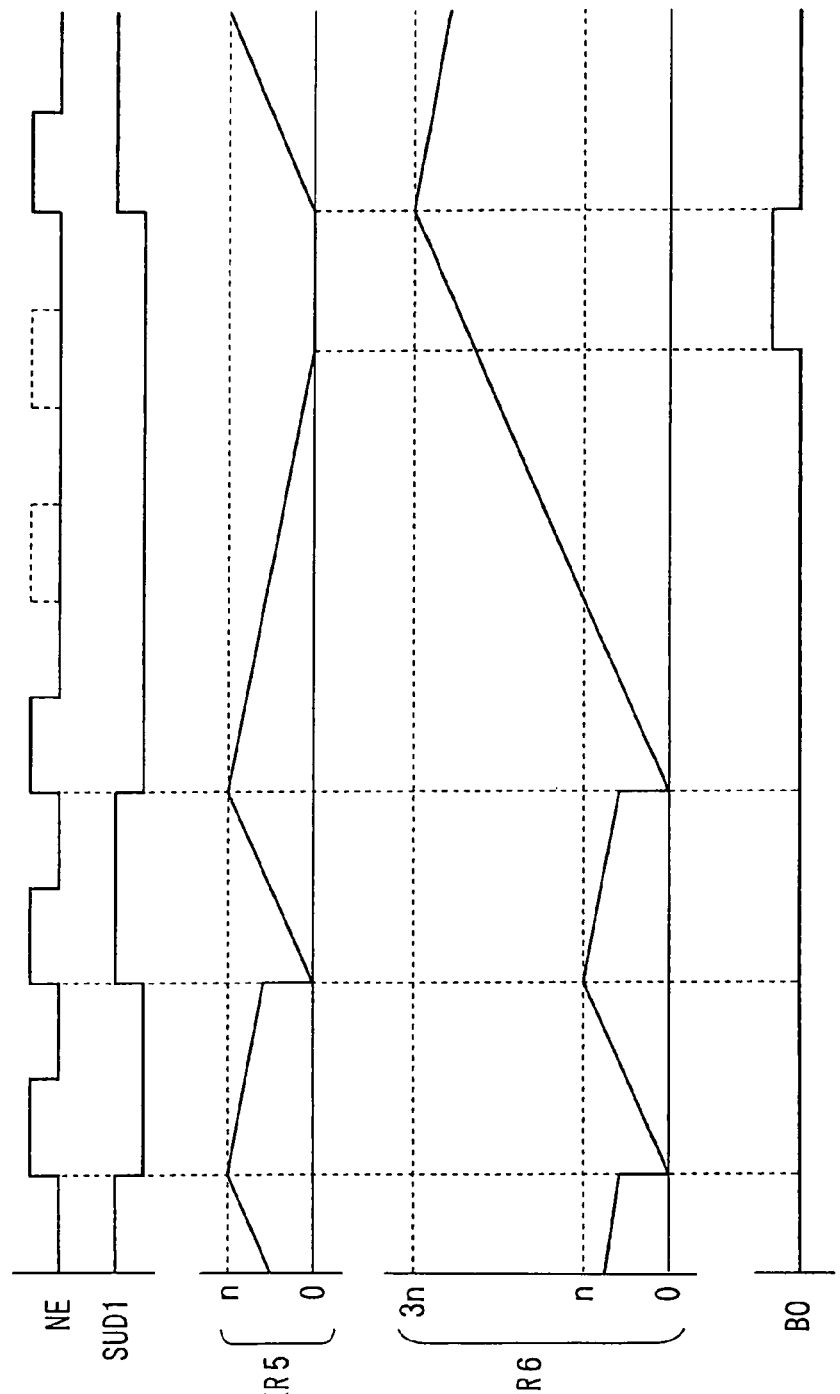

FIG. 12A PRIOR ART SUD1
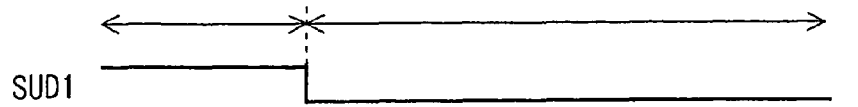
FIG. 12B PRIOR ART CLKU
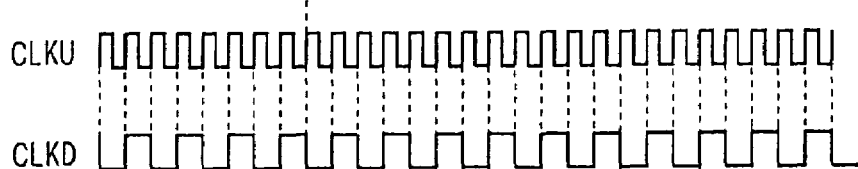
FIG. 12C PRIOR ART CLKD
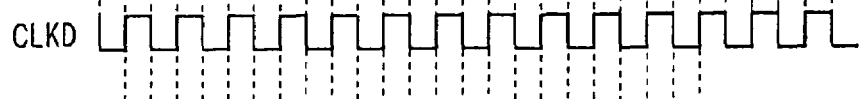
FIG. 12D PRIOR ART
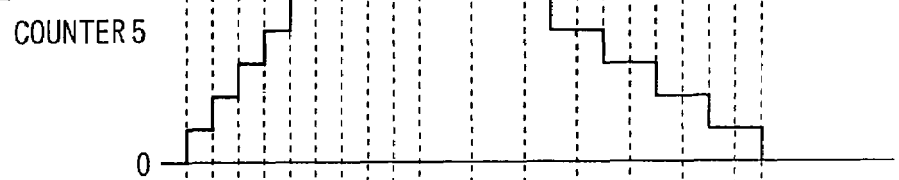
COUNTER 5
FIG. 12E PRIOR ART BO
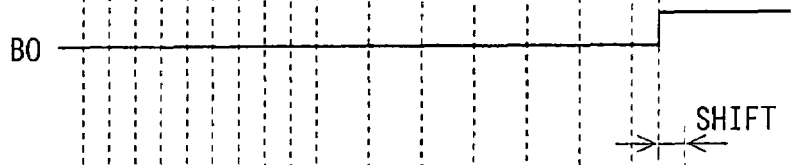
SHIFT
FIG. 13A PRIOR ART CLKU
FIG. 13B PRIOR ART CLKD
FIG. 13C PRIOR ART
COUNTER 5
FIG. 13D PRIOR ART BO

ROTATION POSITION DETECTING DEVICE

CROSS REFERENCE TO RELATED APPLICATION

The present application is based on and claims priority from Japanese Patent Application 2004-31944, filed Feb. 9, 2004, the contents of which are incorporated herein by reference.

BACKGROUND OF THE INVENTION

1. Field of the Invention

The present invention relates to a rotation position detecting device that detects a reference position of a rotating object by means of a rotation signal generated in synchronism with rotation of the rotating object.

2. Description of the Related Art

U.S. Pat. No. 5,264,844 (or its one of basic Japanese patent applications JP-A-Hei 5-66105) discloses a rotation position detecting device that counts the number of clock signals to calculate the cycle time of the pulses of a rotation angle signal. Such a rotation detecting device includes an up-down counter and a f/K frequency dividing circuit, in which a ⅓ frequency dividing circuit and a ½ frequency dividing circuit are combined to provide a down-clock. The above-stated rotation position detecting device measures the cycle time of pulses by counting the number of clock signals, from which the down-clock counts down. The reference position can be detected when a borrow signal appears. U.S. Pat. No. 5,264,844 (or its another basic Japanese patent application JP-A-Hei 5-71909) also discloses a rotation position detecting device as shown in FIGS. 10, 11, 12A and 12B. In this rotation position detecting device 1, a frequency dividing circuit 4 divides an angle signal NE that is sent from a rotation sensor 2 via a wave-shaping circuit 3 into a half to provide a pair of up-down command signals SUD1 and SUD2. A pair of up-down counters 5 and 6 counts up or counts down alternately according to the up-down command signals SUD1 and SUD2 at each cycle time of the angle signal NE.

The direction of counting up or down by the up-down counter 5 is opposite to the direction of counting up or down by the up-down counter 6. Each up-down counter counts up according to an up-clock signal CLKU that is provided by a clock circuit 7 and counts down according to a down-clock signal CLKD that is provided by a 1/K frequency dividing circuit 8. The clock signals applied to the up-down counters 5, 6 are controlled by selectors 9, 10. When edge detecting circuits 11, 12 respectively detect an up-edge of the up-down command signals SUD1, SUD2, the counted values of the up-down counters 5, 6 are reset to 0.

When the rotation sensor 2 detects a non-tooth portion (in an uneven cycle time), the count number of one of the up-down counters 5, 6 becomes 0, so that a borrow signal or detection signal BO is outputted. Because there are two states of the down clock signals CLKD when the up-down command signals changes, the timing of transition from the up-count to the down-count may shift, so that the detection signal BO may not be provided at a right timing, as shown in FIGS. 12A–12E and 13A–13D.

Because the down clock signal CLKD is formed by dividing the up clock signal CLKU into 1/K according to the number of non-toothed portions, the frequency of the down clock signal CLKD becomes lower than the up clock signal CLKU. Therefore, a half-cycle shift of the down clock signal CLKD becomes K times as long as a half cycle of the up clock signal CLKU. If the shift of the detection signal BO becomes larger, the frequency of the clock signal has to be increased, resulting in increasing power of the clock circuit.

SUMMARY OF THE INVENTION

An object of the present invention is to provide an improved rotation position detecting device that can accurately measure a non-pulse portion of an angular signal.

According to a first main feature of the invention, a rotation position detecting device includes a first counter for counting up a clock signal an up-down command signal changes from a first level to a second level to reset and subsequently counting down the clock signal when the up-down command signal changes from the second level to the first level, a second counter for counting up the clock signal when the up-down command signal changes from the second level to the first level to reset and subsequently counting down the clock signal when the up-down command signal changes from the first level to the second level, a first processing circuit for providing a first reference value P1 that is provided by subtracting a product N1×K of the counted value N1 of the first counter when the up-down command signal changes from the second level to the first level and a constant K that is a value larger than 1 and corresponds to the non-pulse portion from a counted value N1 counted by the first counter, a second processing circuit for providing a second reference value P2 that is provided by subtracting a product of the counted value N2 of the second counter when the up-down command signal changes from the first level to the second level and the constant K from a counted value N2 counted by the second counter, a first comparator for generating a first detection signal when the counted number N1 of the first counter becomes smaller than the first reference value P1 and a second comparator for generating a second detection signal when the counted number N2 of the second counter becomes smaller than the second reference value P2.

In the above rotation position detecting device, the counters count up or down clock pulses of a common clock. Therefore, shift in the first and second detection signals is limited within one cycle of the clock signal, so that accuracy of the detection signal can be improved. Because the constant K is larger than 1, a sufficient time (within one clock cycle) for the processing circuits to calculate can be provided until the counted value is counted down to an initial value (zero). Therefore, the processing circuits can be provided in either hardware or software.

According to a second main feature of the invention, a rotation position detecting device includes substantially the same components as the above. In this device, a first processing circuit provides a first reference value P1 that is a product of the counted value (N2) of the second counter when the up-down command signal changes from the first level to the second level and a constant K that corresponds to the non-pulse portion, a second processing circuit for providing a second reference value P2 that is a product of the counted value (N1) of the first counter when the up-down command signal changes from the second level to the first level and the constant K. This device is also as effective as the above device.

According to a feature in addition to the first and second features, the rotation position detecting device includes a first latch circuit for latching the counted value of the first counter when the up-down command signal changes from the second level to the first level and a second latch circuit for latching the counted value of the second counter when the up-down command signal changes from the first level to the second level.

According to another feature in addition to the above features, the rotation position detecting device further includes means for detecting one of up-edge and down edge of the angular signal in synchronism with the clock pulse and generating a first edge signal when an edge is detected while the up-down command signal is in the first level and a second edge signal when an edge is detected while the up-down command signal is in the second level. In this feature the following operations are carried out: the first counter is reset by the second edge signal; the second counter is reset by the first edge signal; the first latch circuit latches the counted value of the first counter by the first edge signal; and the second latch circuit latches the counted value of the second counter by the second edge signal.

According to a third main feature of the invention, a rotation position detecting device includes means for generating an angular signal having pulses the cycle period of which is even or equal when a rotating object rotates at a constant rotation speed and a non-pulse portion which corresponds to a reference position, a clock pulse generating circuit which generates pulses at equal intervals, a counter for counting the pulses of the clock signal from a reset value when the angular signal changes from a first level to a second level, a processing circuit for providing a reference value P by multiplying a counted value N of the counter when the angular signal changes from the first level to the second level and a constant K that corresponds to the non-pulse portion and means for generating a detection signal when the counted number of the counter becomes larger than the reference value.

This feature also brings about similar effects as described with respect to the first and the second features.

According to a feature in addition to the third main feature, the rotation position detecting device of the third main feature further includes a latch circuit for latching the counted value of the counter when the angular signal changes from the first level to the second level.

According to a feature in addition to the third main feature, the rotation position detecting device of the third main feature further includes a gate circuit which masks the detection signal outputted by the comparator as long as the processing circuit is calculating the reference value.

According to a feature in addition to the third main feature, the angular signal of the rotation position detecting device of the third main feature synchronizes with rotation of an internal combustion engine.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 2A–2R show wave shapes that respectively appear at various portions of the electrical structure illustrated in FIG. 1;

FIGS. 3A–3D show the wave shapes shown in FIGS. 2A, 2F, 2N and 2R for a longer period of time;

FIGS. 5A–5R show wave shapes that respectively appear at various portions of the electrical structure illustrated in FIG. 4;

FIGS. 6A–6D show the wave shapes shown in FIGS. 5A, 5F, 5N and 5R for a longer period of time;

FIGS. 11A–11D show wave shapes respectively appear at various portions of the electrical structure illustrated in FIG. 10;

FIGS. 12A–12E show a relationship in timing between a detection signal and an up-down command signal provided in the electrical structure illustrated in FIG. 10; and FIGS. 13A–13D show a relationship in timing between a detection signal and an up-down command signal provided in the electrical structure illustrated in FIG. 10.

DETAILED DESCRIPTION OF THE PREFERRED EMBODIMENTS

A rotation position detecting device 21 according to the first embodiment of the invention will be described with reference to FIGS. 1–3.

Figure 1:
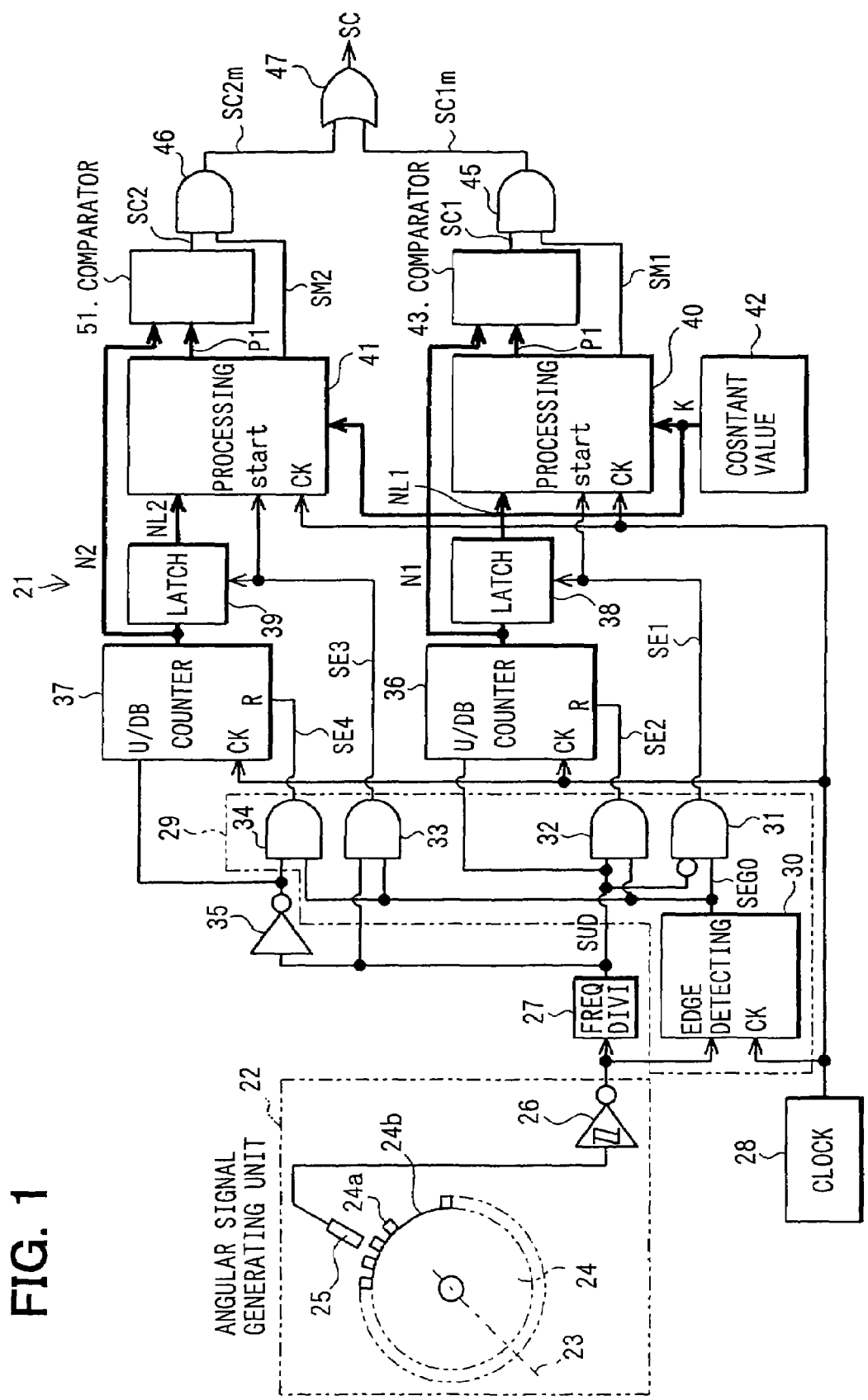
FIG. 1 is a block diagram illustrating an electrical structure of a rotation position detecting device according to the first embodiment of the invention.

As shown in FIG. 1, the rotation position detecting device 21 includes an angular signal generating unit 22, a wave shaping circuit 26, a frequency dividing circuit 27, a clock signal generating circuit or clock 28, an edge signal generating circuit 29, a pair of counters 36, 37, a apir of latch circuits 38, 39, a pair of processing circuits 40, 41, a constant value holding circuit 42, comparators 43, 44, AND gates 45, 46 and an OR gate 47.

The rotation position detecting device 21 detects a reference position from a signal NE that is sent from the angular signal generating unit 22. The angular signal generating unit 22 generates an angular signal that corresponds to a rotation position of a crank or cam shaft 23, which is an object to be detected. The angular signal generating unit 22 includes a rotor 24 that has thirty four teeth 24a on its outer periphery at 10-degree-angle intervals, a rotation sensor 25 that is made up of such as an electromagnetic pick-up sensor, a hall element or a photo sensor and a wave shaping circuit 26. The rotor 24 is fixed to the crank or cam shaft 24. The above-stated non-tooth portion 24b has two tooth-pitches formed between the teeth 24a on the outer periphery of the rotor 24. The rotation sensor 25 is disposed at a portion that confronts the teeth 24a and the non-tooth portion 24a.

The output signal of the rotation sensor 25 is sent to the wave shaping circuit 26 to provide the angular signal NE. The output terminal of the wave shaping circuit 26 is connected to a frequency dividing circuit 27, which is composed of a D flip flop circuit whose Q terminal and D terminal are connected. The frequency dividing circuit 27 divides the frequency of the angular signal into a half to provide an up-down command signal SUD. The clock 28 provides a clock signal CLK having a constant cycle period.

The edge signal generating circuit 29 detects each up-edge of the angular signal NE and provides edge signals SE1–SE4 based on selected up-edges. The edge signal generating circuit 29 includes an edge detecting circuit 30 and AND gates 31–34. The edge detecting circuit 30 detects up-edges of the angular signal SE in synchronism with the clock signal CLK to provide an edge signal SEG0 whose level transitorily becomes H.

The AND gate 31 has input terminals for the up-down command signal SUD and the edge signal SEG0 and provides an edge signal SE1 that is the logical product of the two signals. The edge signal SE 1 becomes a latch signal for the latch circuit 38. The AND gate 32 has input terminals for the up-down command signal SUD and the edge signal SEG0 and provides an edge signal SE2 that is the logical product of the two signals. The edge signal SE2 becomes a reset signal or an initializing signal for the counter 36. The AND gate 33 has input terminals for the up-down command signal SUD and the edge signal SEG0 and provides an edge signal SE3 that is the logical product of the two signals. The edge signal SE 3 becomes a latch signal for the latch circuit 39.

The AND gate 34 has input terminals for the inversed signal of the up-down command signal SUD inversed by an inverter 35 and the edge signal SEG0 and provides an edge signal SE4 that is the logical product of the two signals. The edge signal SE4 becomes a reset signal or an initializing signal for the counter 37. The edge signals SE1, SE4 become H level when the up-down command signal SUD changes from H level to L level, while the edge signals SE2, SE4 become H level when the up-down command signal SUD changes from L level to H level.

The counters 36, 37 respectively have an up-down command terminal U/DB and a clock terminal CK. When the up-down command terminal U/DB of the counters 36, 37 becomes L level, the counters 36, 37 count down the clock signal CLK that is inputted to the respective terminals CK. When the up-down command terminal U/DB of the counters 36, 37 becomes H level, the counters 36, 37 count up the clock signal CLK that is inputted to the respective terminals CK. Thus, the direction of counting by the counter 36 is always opposite to the direction of counting by the counter 37. The counted values of the counters 36, 37 are respectively reset to 0 or initialized by the edge signals SE1 and SE4.

The latch circuits 38, 39 respectively latch the counted values of the counters 36, 37 when the edge signals SE1, SE2 respectively become H level. The processing circuits 40 receives the latched counted value NL1 from the latch circuit 38 and a constant value K from the constant value holding circuit 42 respectively at its input terminals to calculate a reference value P1=NL1–(NL1×K) when the edge signal SE1 becomes H level. The processing circuits 40 receives the latched counted value NL2 from the latch circuit 39 and the same constant value K from the constant value holding circuit 42 respectively at its input terminals to calculate a reference value P2=NL2–(NL2×K) when the edge signal SE3 becomes H level.

Each of the processing circuits 40, 41 is composed of logical circuits that operate in synchronism with the clock signal CLK. The constant value holding circuit 42 is composed of registers and memories. The processor circuit 40 provides a masking signal SM1 that keeps L level only for a period from time at which the edge signal SE1 changes to H level until the reference value P1 has been calculated. The processor circuit 41 provides a masking signal SM2 that keeps L level only for a period from time at which the edge signal SE3 changes to H level until the reference value P2 has been calculated.

The comparator 43 compares a counted value N1 of the counter 36 with the reference value P1 that is provided by the processing circuit 40 and provides a detection signal SC1 when the counted value N1 is smaller than the reference value P1. The comparator 44 also compares a counted value N2 of the counter 37 with the reference value P2 that is provided by the processing circuit 41 and provides a detection signal SC2 when the counted value N2 is smaller than the reference value P2.

The AND gate 45 has a pair of input terminals to which the detection signal SC1 and the masking signal SM1 are respectively inputted and an output terminal that outputs a masked detection signal SC1m. The AND gate 46 also has a pair of input terminals to which the detection signal SC2 and the masking signal SM2 are respectively inputted and an output terminal that outputs a masked detection signal SC2m. The OR gate 47 receives the masked detection signals SC1m, SC2m at its input terminals and provides a detection signal SC for the non-tooth portion 24b at its output terminal.

When the rotor 24 rotates together with the crank shaft or cam shaft 23, the rotation sensor 25 that is disposed near the rotor 24 generates a signal that changes in response to the teeth 24a on the periphery of the rotor 24. This signal is formed by the wave shaping circuit 26 into the angular signal NE that has rectangular waves. The angular signal NE is sent to the frequency dividing circuit 27 to provide the up-down command signal SUD. Therefore, the frequency of the up-down command signal SUD is a half of the angular signal NE, and the level of the up-down command signal SUD changes in synchronism with the up-edges of the angular signal NE.

When an up-change of the angular signal NE appears at time t1 in FIG. 2, the edge signal SE2 changes to H level, the counted value N1 of the counter 36 is reset to 0. During the period from t1 to t3 which corresponds to the cycle period of the angular signal NE, the up-down command signal SUD keeps H level so that the counter 36 can count up the clock signal CLK.

When the next up-edge appears in the angular signal NE at time t3, the edge signal SE1 changes to H level, so that the counted value N1 of the counter 36 is latched by the latch circuit 38. Thereafter, the up-down command signal SUD keeps L level during the cycle period of the angular signal NE from t3 to t5. Therefore, the counter 36 counts down the clock signal CLK from the latched counted value N1 (=NL1).

When the edge signal SE1 becomes H level, the processing circuit 40 takes the latched count number NL1 into the input terminal thereof from the latch circuit 38 to calculate the reference value P1=NL1–(NL1×K) during the period from t3 to t4 (or Δt). Incidentally, arrows extending from the counted value N1 to the reference value P1 in FIG. 2F indicate a functional relationship between the counted value N1 and the reference value P1. The processing circuit 40 keeps the reference value P1 calculated last time until a new reference value P1 has been calculated.

The comparator 43 always compares the counted value N1 with the reference value P1 and provides the detection signal SC1 if the counted value N1 is smaller than the reference value P1. Masking by the masking signal SM1 is also carried out lest the detection signal is erroneously provided during the above operation. In case of the non-tooth portion 24b having two tooth-pitches as shown in FIG.

1, the constant value K is set to 2.0. The reference value P1 becomes −NL1, so that N1≦P1 regarding the non-tooth portion never happens even if the rotation speed of the crank or cam shaft 23 abruptly decreases. If the rotation speed is constant, the edge signal SE2 becomes H level when the counted value N1 decreases to 0 at time t5, as shown in FIG. 2F. In case of a constant rotation speed, the edge signal SE2 becomes H level when the counted value N1 is counted down to zero, and the counter 36 starts to count up.

After the counter 36 changes to count down at time t7, no H level pulse is provided in the edge signal SE2 (during the period from t9 to t10) due to the non-tooth portion. Therefore, the counter 36 continues to count down until the edge signal SE 2 becomes H level at time t11. As a result, the counted value N1 becomes smaller than the reference value P1 at t10, so that the detection signal SC1 becomes H level, which indicates the non-tooth portion.

The other set of the counter 37, the latch circuit 39, the processing circuit 41 and the comparator 44 operates in the same manner as above. When the counter 37 measures the cycle period, it can not count up during the non-tooth period. Thus, a pair of the counters 36, 37 operates to complement each other.

If the constant number K is 2.0 and the rotation speed is constant, as shown in FIGS. 3A–3D, the non-tooth portion whose tooth-pitch is larger than 1 can be detected. In FIG. 3A, a portion indicated by A has 1.5 tooth-pitches and a portion indicated by B has 2 tooth pitches. Incidentally, the constant K is determined according to the rotation speed of the crank shaft or cam shaft 23.

Because the counters 36, 37 use the same clock signal CLK, no delay or time shift arises when each of the counters 36, 37 changes from counting up to counting down. In other words, the shift in timing is limited within one cycle period of the clock signal CLK when the edge signals SE1–SE4 are generated by the edge signal generating circuit 29.

Second Embodiment

A rotation position detecting device according to the second embodiment of the invention will be described with reference to FIGS. 4–6. Incidentally, the same reference numeral as the precedent embodiment of this application indicates the same or substantially the same part, component or unit as the precedent embodiment.

Figure 4:
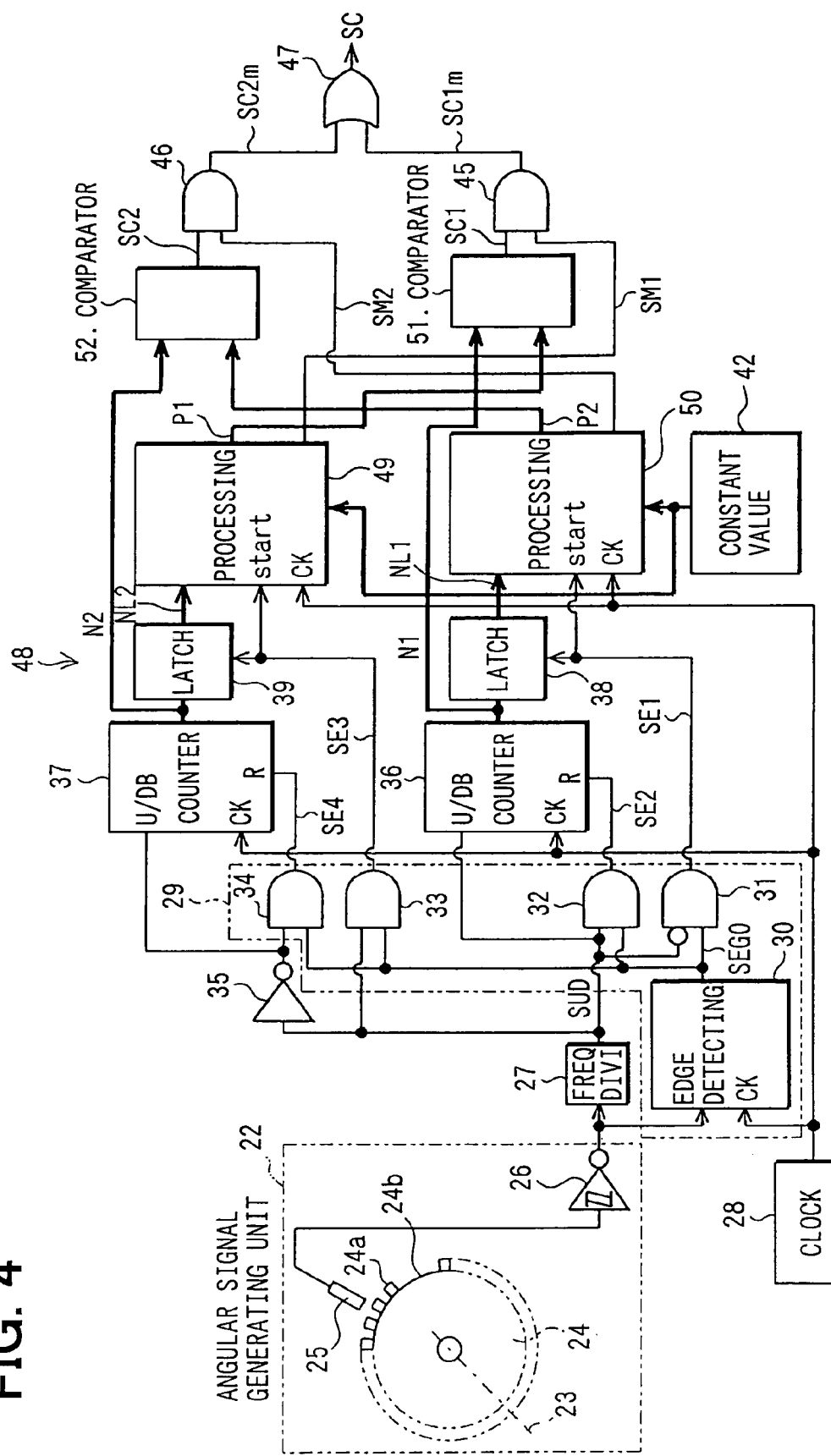
FIG. 4 is a block diagram illustrating an electric structure of a rotation position detecting device according to the second embodiment of the invention.

As shown in FIG. 4, a rotation position detecting device 48 a pair of processing circuits 40, 41 instead of the processing circuits 50, 49 of the rotation position detecting device 21 according to the first embodiment. When the edge signal SE3 becomes H level, the processing circuit 49 takes in the latched counted value NL2 from the latch circuit 39 and the constant value K from the constant value holding circuit 42 to calculate the reference value P2=NL2×K. When the edge signal SE1 becomes H level, the processing circuit 50 takes in the latched counted value NL1 from the latch circuit 39 and the constant value K from the constant value holding circuit 42 to calculate the reference value P1=NL1×K. The processing circuits 49, 50 are composed of logical circuits that operate in synchronism with the clock signal CLK, and provide masking signals SM1, SM2 during operation.

The rotation position detecting device 48 has a pair of comparators 43, 44 instead of the comparator 43, 44 of the rotation position detecting device 21. The comparator 51 compares the counted value N1 serially provided by the counter 36 with the reference value P1 provided by the processing circuit 49 so as to provide the detection signal SC1 if the counted value N1 is larger than the reference value P1. The comparator 52 also compares the counted value N1 serially provided by the counter 37 with the reference value P2 provided by the processing circuit 50 so as to provide the detection signal SC2 if the counted value N2 is larger than the reference value P2.

The AND gate 45 receives the detection signal SC1 and the masking signal SM1 and provides a masked detection signal SC1m, and the AND gate 46 also receives the detection signal SC2 and the masking signal SM2 and provides a masked detection signal SC2m. The OR gate 47 receives the masked detection signals SC1m, SC2m to provide a detection signal SC of the non-tooth portion 24b.

As shown in FIG. 5, the processing circuit 50 receives a latched counted signal NL1 from the latch circuit 38 when the edge signal SE1 becomes H level at time t23 and calculates the reference value P2 that is equal to NL1×K for a period Δt from t23 to t 24. The processing circuit 49 also receives a latched counted signal NL2 from the latch circuit 39 when the edge signal SE2 becomes H level at time t25 and calculates the reference value P1 that is equal to NL2×K for the period Δt from t25 to t 26.

The processing circuits 49, 50 keep providing the reference values P1, P2 that are calculated last time until the calculation has been completed. In other words, the processing circuits 49, 50 provide the new reference values P1, P2 as soon as the calculation is completed.

The comparator 51 always compares the counted value N1 with the reference value P1 to provide the detection signal SC1 when the counted value N1 is larger than the reference value P1. The constant value K is set to 2 as the non-tooth portion has two tooth pitches. Therefore, the reference values P1 and P2 are respectively equal to 2×NL2 and 2×NL1, so that N1≧P1 or N2≧P2 never occurs at the non-tooth portion even if rotation speed of the crank shaft or cam shaft 23 sharply decreases. If the rotation speed is constant at a time such as t23 or t25, the counters start to count down as soon as they have counted up to NL1 or N12.

At the non-tooth portion, the edge signal SE3 does not provide a H-level pulse (e.g. at time t29, t30) after the counter 37 is reset to count up (e.g. at time t27). Therefore, the counter 37 keeps counting up until the edge signal SE3 becomes H level. As a result, the counted value N2 becomes larger than the reference value P2 at time t30, so that the detection signal SC2 becomes H level to detect the non-tooth portion.

As shown in FIGS. 6A–6D, the non-tooth portion having 1.5 tooth pitches (indicated by A) as well as the non-tooth portion having 2 tooth-pitches (indicated by B) can change the detection signal from L level to H level if the rotation speed is constant. That is, the non-tooth portion having a tooth pitch of more than 1 can be detected if the rotation speed is constant with the constant value K being 2.

Third Embodiment

A rotation position detecting device according to the third embodiment of the invention will be described with reference to FIGS. 7–9.

Figure 7:
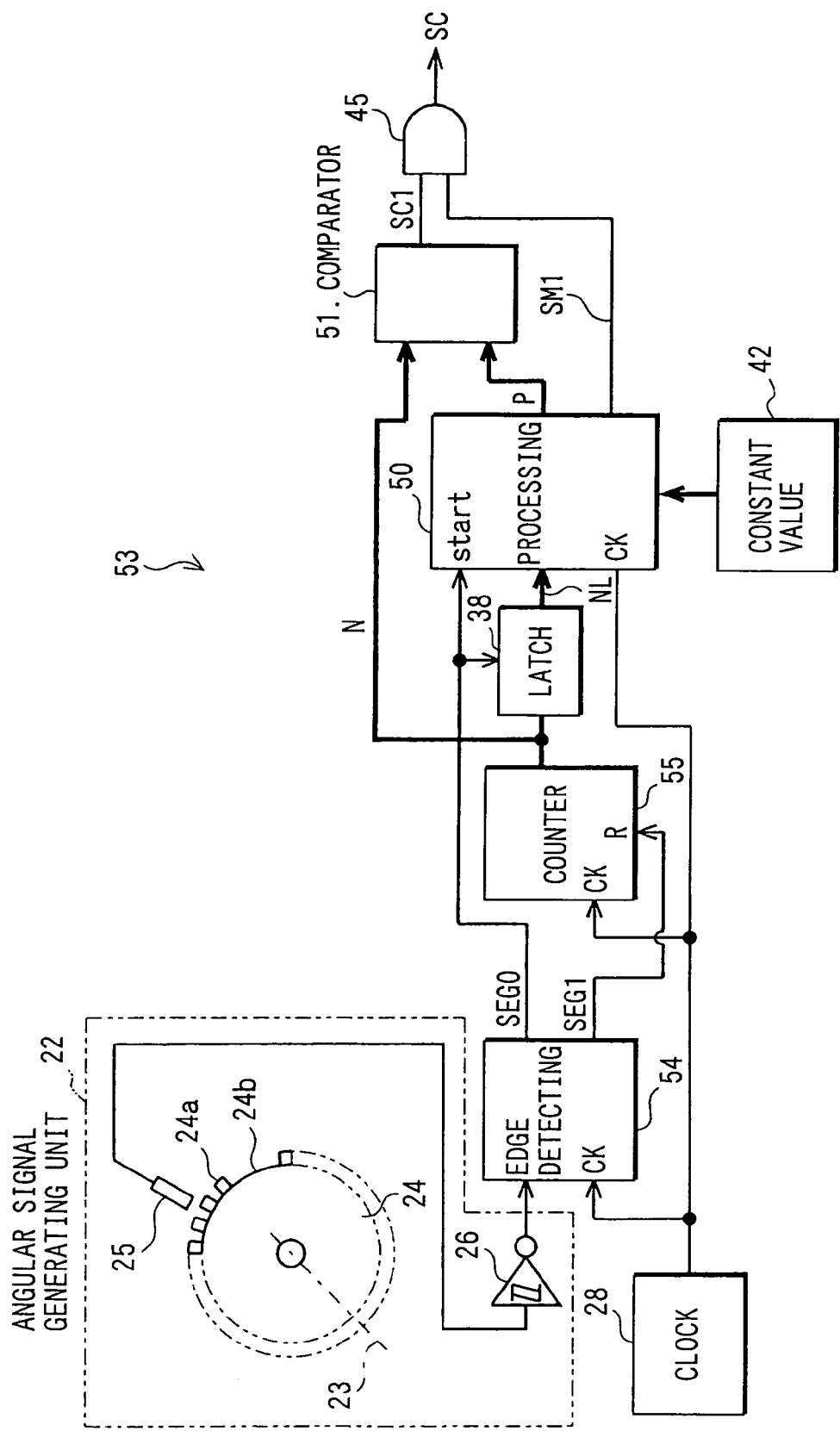
FIG. 7 is a block diagram illustrating an electric structure of a rotation position detecting device according to the third embodiment of the invention.

As shown in FIG. 7, the rotation position detecting device 53 includes a single up-down counter 55, a single latch circuit 38, a single processing circuit 50, a single comparator as well as an edge detecting circuit 54 and an AND gate 45 to detect the non-tooth portion 24b.

The edge detecting circuit 54 synchronizes with the clock signal CLK to detect up-edges of the angular signal NE and provides an edge signal SEG0 that becomes H level when each up-edge is detected. The edge detecting circuit 54 provides an edge signal SEG1 that becomes H level a little time after the edge signal SEG0 does. The delay time is a little longer than a period in which the latch circuit 38 can latch a counted value of the counter 55.

The counter 55 is an N-bit counter. The latch circuit 38 latches each counted value counted by the counter 38 by the use of the edge signal SEG0. The processing circuit 50 is formed of logical circuits that operate in synchronism with the clock signal CLK. The processing circuit 50 receives a latched counted value NL and calculate a reference value P=NL×K when the edge signal SEG0 becomes H level. The constant value K is provided by a constant value holding circuit 42. The processing circuit 50 provides a masking signal SM1 while it is calculating the reference value P.

The comparator 51 compares the counted value N with the reference value P and provides a detection signal SC1 when the counted value N is larger than the reference value P. The AND gate 45 receives the detection signal SC1 and the masking signal SM1 to provide a masked detection signal SC.

Figure 8:
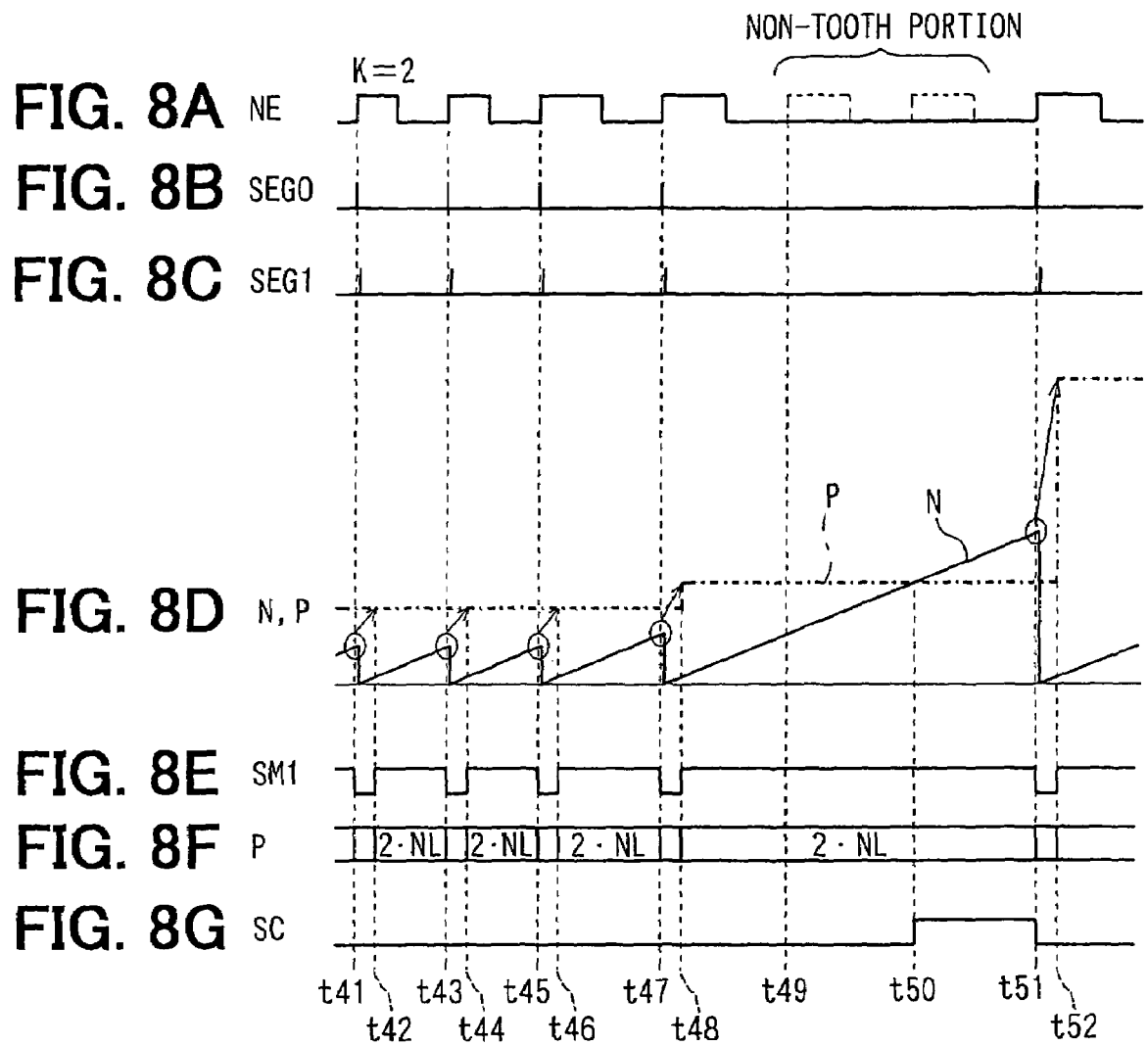
FIGS. 8A–8G show wave shapes respectively appear at various portions of the electrical structure illustrated in FIG. 7.
Figure 9:
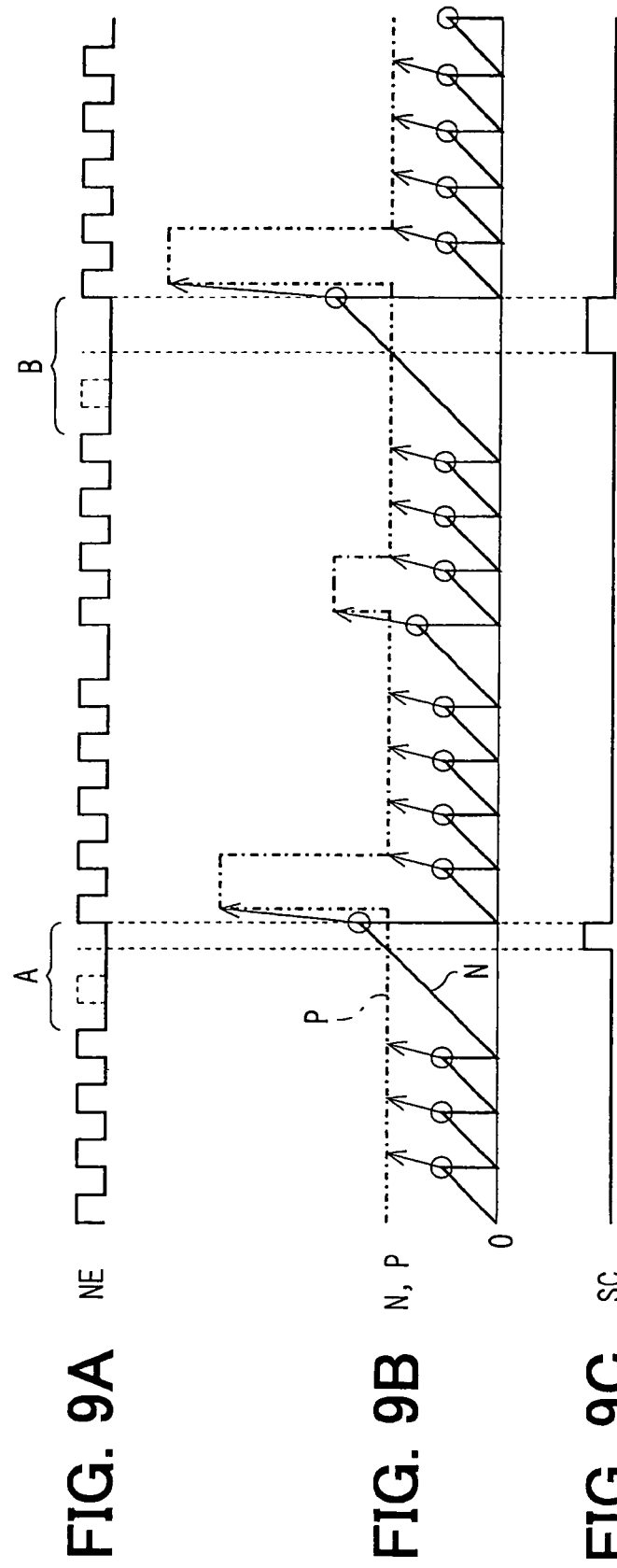
FIGS. 9A–9C show the wave shapes shown in FIGS. 8A, 8D and 8G for a longer period of time.
Figure 10:
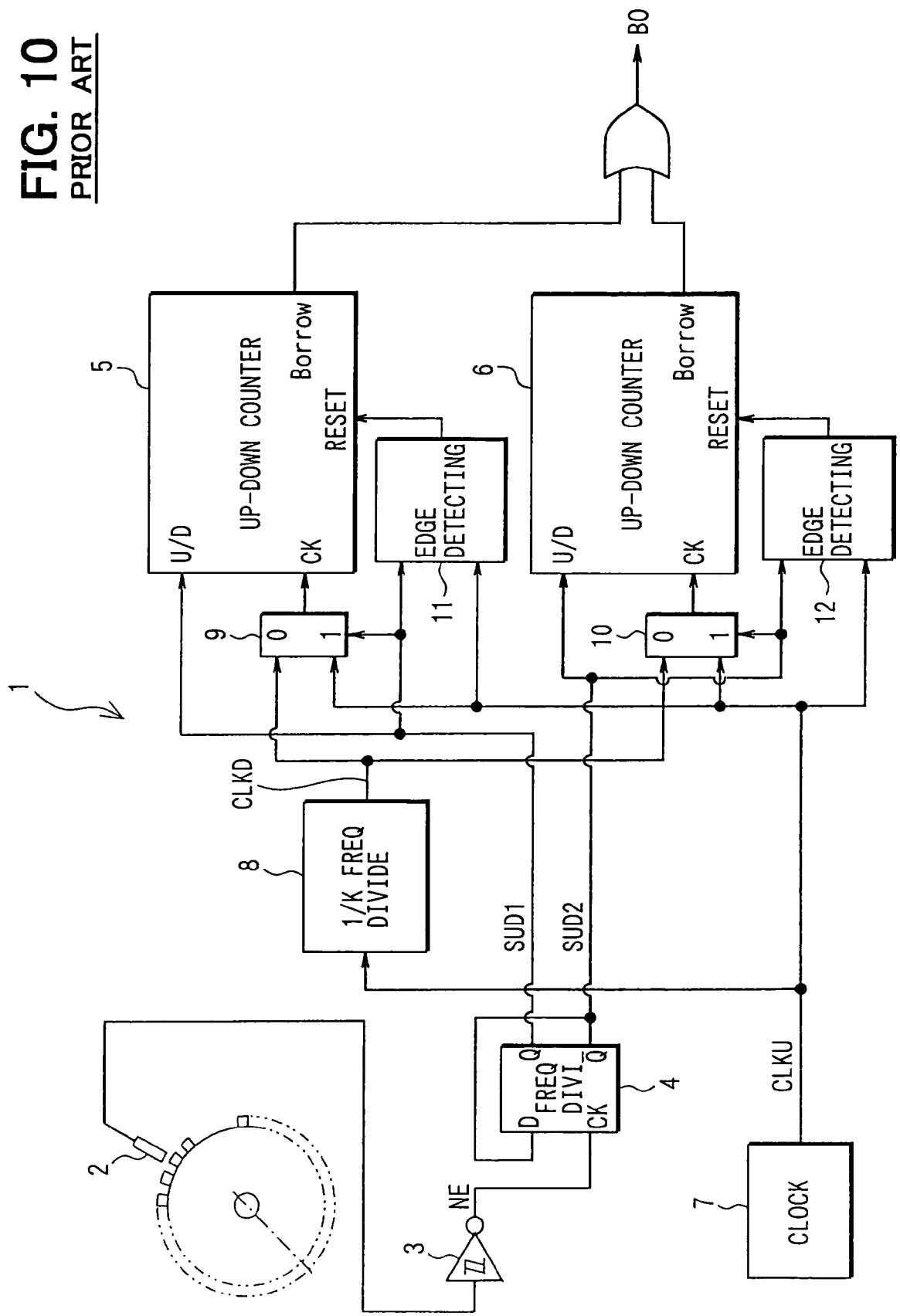
FIG. 10 is a block diagram illustrating an electric structure of a prior art rotation position detecting device.

When an up-edge appears in the angular signal NE at time t41 as shown in FIG. 8, the edge signal SEG0 becomes H level, so that the counted number of the counter 55 is latched by the latch circuit 38. As soon as the latching has completed, the edge signal SEG1 becomes H level, so that the counted number N of the counter 55 is reset to 0.

The processing circuit 50 receives the latched counted value NL from the latch circuit 38 to calculate the reference value P that is equal to NL×K in a period Δt from t41 to t42 each time the edge signal SEG0 becomes H level.

The comparator 51 always compares the counted value N with the reference value P to provide the detection signal SC whenever the counted value N is larger than the reference value P. The constant value K is set to 2 as the non-tooth portion has two tooth pitches. Therefore, the reference value P is equal to 2×NL, so that N≧P never occurs at the non-tooth portion even if rotation speed of the crank shaft or cam shaft 23 sharply decreases. If the rotation speed is constant at a time such as t43 or t45, the edge signal SEG1 becomes H level as soon as the counted value N becomes NL. Therefore, the counter 55 is reset to 0, from where it starts to count up.

At the non-tooth portion, the edge signal SEG1 does not provide a H-level pulse (e.g. at time t49, t50) after the counter 55 is reset to count up (e.g. at time t47). Therefore, the counter 55 keeps counting up until the edge signal SEG1 becomes H level (t1). As a result, the counted value N becomes larger than the reference value P at time t50, so that the detection signal SC becomes H level to detect the non-tooth portion.

As shown in FIGS. 9A–9C, the non-tooth portion having 1.5 tooth pitches (indicated by A) as well as the non-tooth portion having 2 tooth-pitches (indicated by B) can change the detection signal SC from L level to H level if the rotation speed is constant. That is, the non-tooth portion having a tooth pitch of more than 1 can be detected if the rotation speed is constant with the constant value K being 2.

Shift of timing is limited within a cycle period of the clock signal CLK, as the edge detecting circuit 54 provides the edge signals SEG0, SEG1 in synchronism with the clock signal CLK. The reset timing of the counter 55 by the edge signal SEG1 delays from the edge of the angular signal NE (edge signal SEG0) only by a holding time of the latch circuit 38.

In the above embodiment, the constant value K is not limited to 2 in case that the tooth-pitch of the non-tooth portion is 2. The AND gates 33 and 34 of the first and the second embodiment can be omitted because the edge signals SE1 and SE4 are the same and, also, the edge signals SE2 and SE3 are the same. The AND gates 45 and 46 can be omitted if the masking is not necessary. The latch circuits 38 and 39 can be also omitted if the processing circuits 40, 41, 49 and 50 includes a latch function.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation position detecting device comprising:
means for generating an angular signal having pulses the cycle period of which is even when a rotating object rotates at a constant rotation speed and a non-pulse portion which corresponds to a reference position;
a clock pulse generating circuit which generates pulses at equal intervals;
an up-down command circuit for generating an up-down command signal the frequency of which is divided to a half of the frequency of the angular signal;
a first counter for counting up the clock signal when the up-down command signal changes from a first level to a second level to reset and subsequently counting down the clock signal when the up-down command signal changes from the second level to the first level;
a second counter for counting up the clock signal when the up-down command signal changes from the second level to the first level to reset and subsequently counting down the clock signal when the up-down command signal changes from the first level to the second level;
a first processing circuit for providing a first reference value that is provided by subtracting a product of the counted value of the first counter when the up-down command signal changes from the second level to the first level and a constant that corresponds to the non-pulse portion from a counted value counted by the first counter;
a second processing circuit for providing a second reference value that is provided by subtracting a product of the counted value of the second counter when the up-down command signal changes from the first level to the second level and the constant from a counted value counted by the second counter;
a first comparator for generating a detection signal when the counted number of the first counter becomes smaller than the first reference value; and
a second comparator for generating a detection signal when the counted number of the second counter becomes smaller than the second reference value.

2. The rotation position detecting device as claimed in claim 1 further comprising:
a first latch circuit for latching the counted value of the first counter when the up-down command signal changes from the second level to the first level; and
a second latch circuit for latching the counted value of the second counter when the up-down command signal changes from the first level to the second level.

3. The rotation position detecting device as claimed in claim 2, further comprising means for detecting one of up-edge and down edge of the angular signal in synchronism with the clock pulse and generating a first edge signal when an edge is detected while the up-down command signal is in the first level and a second edge signal when an edge is detected while the up-down command signal is in the second level; wherein
    the first counter is reset by the second edge signal,
    the second counter is reset by the first edge signal,
    the first latch circuit latches the counted value of the first counter by the first edge signal, and
    the second latch circuit latches the counted value of the second counter by the second edge signal.

4. A rotation position detecting device comprising:

means for generating an angular signal having pulses the cycle period of which is even when a rotating object rotates at a constant rotation speed and a non-pulse portion which corresponds to a reference position;

a clock pulse generating circuit which generates clock pulses at equal intervals;

an up-down command circuit for generating an up-down command signal the frequency of which is divided to a half of the frequency of the angular signal;

a first counter for counting up the clock signal when the up-down command signal changes from a first level to a second level to reset and subsequently counting down the clock signal when the up-down command signal changes from the second level to the first level;

a second counter for counting up the clock signal when the up-down command signal changes from the second level to the first level to reset and subsequently counting down the clock signal when the up-down command signal changes from the first level to the second level;

a first processing circuit for providing a first reference value that is a product of the counted value of the second counter when the up-down command signal changes from the first level to the second level and the constant;

a second processing circuit for providing a second reference value that is a product of the counted value of the first counter when the up-down command signal changes from the second level to the first level and the constant;

a first comparator for generating a detection signal when the counted number of the first counter becomes larger than the first reference value; and a second comparator for generating a detection signal when the counted number of the second counter becomes larger than the second reference value.

5. A rotation position detecting device comprising:

means for generating an angular signal having pulses the cycle period of which is even when a rotating object rotates at a constant rotation speed and a non-pulse portion which corresponds to a reference position;

a clock pulse generating circuit which generates pulses at equal intervals;

a counter for counting the pulses of the clock signal from a reset value when the angular signal changes from a first level to a second level;

a processing circuit for providing a reference value by multiplying the counted value of the counter when the angular signal changes from the first level to the second level and a constant that corresponds to the non-pulse portion; and means, including a comparator, for generating a detection signal when the counted number of the counter becomes larger than the reference value.

6. The rotation position detecting device as claimed in claim 5 further comprising:

a latch circuit for latching the counted value of the counter when the angular signal changes from the first level to the second level.

7. The rotation position detecting device as claimed in claim 6 further comprising:

a gate circuit which masks the detection signal outputted by the comparator as long as the processing circuit is calculating the reference value.

8. The rotation position detecting device as claimed in claim 5, wherein the angular signal synchronizes with rotation of an internal combustion engine.

\* \* \* \* \*